Feb. 15, 1955 O. A. JANSSON 2,702,308
METHOD AND MEANS FOR THE CHARGING OF ACCUMULATORS
OR FORMING OF ACCUMULATOR PLATES
Filed April 28, 1952

Oscar Alexius Jansson Inventor

By Cushman, Darby & Cushman
Attorneys

United States Patent Office 2,702,308
Patented Feb. 15, 1955

2,702,308

METHOD AND MEANS FOR THE CHARGING OF ACCUMULATORS OR FORMING OF ACCUMULATOR PLATES

Oscar Alexius Jansson, Toreboda, Sweden

Application April 28, 1952, Serial No. 284,724

4 Claims. (Cl. 136—34)

The present invention relates to the charging of electric accumulators or forming of accumulator plates, and the invention has for its object a method to render said charging and forming more effective.

Another object of the invention is to provide means for performance of the charging of accumulators or forming of plates whereby said processes may be carried out in such a way, that the capacity of the accumulators may be increased.

Figure 1:
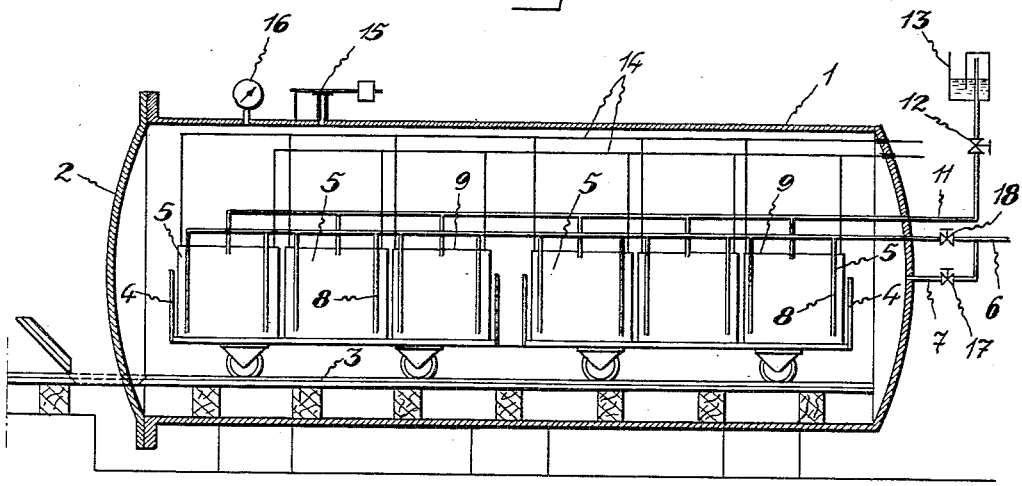
Figure 2:
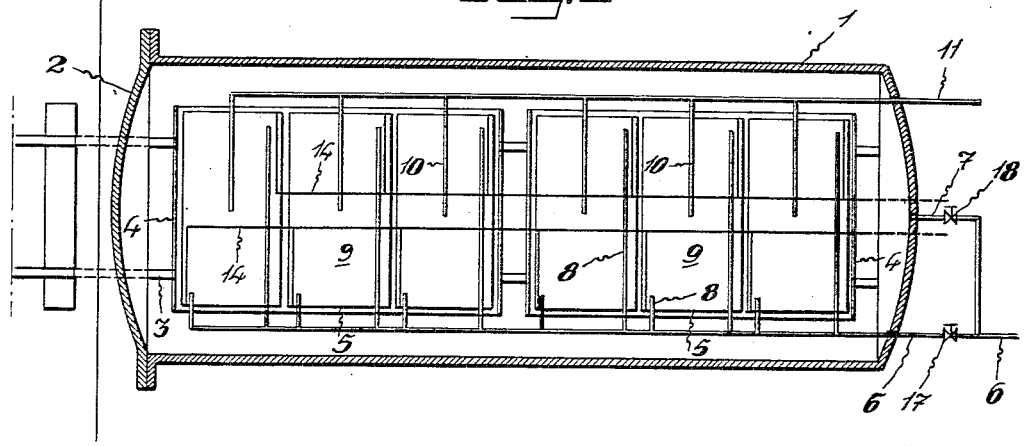

In the accompanying drawing there is shown an embodiment of an apparatus according to the invention. Here is Fig. 1 a vertical longitudinal section through the apparatus and Fig. 2 a horizontal longitudinal section through the same apparatus.

In the drawing 1 denotes a lying cylindrical receptacle, which at one end is provided with a cover 2, which may be secured to the receptacle in any convenient way. At the bottom of the receptacle there are provided rails 3 for cars 4 supporting complete accumulators or special vessels for forming of accumulator plates, which accumulators or vessels are denoted by 5.

The receptacle 1 is provided with an inlet conduit 6 which is adapted to be connected to a pressure gas source, preferably an air compressor or the like. The conduit 6 is provided with a branch conduit 7, by means of which the receptacle 1 can be set under pressure. The conduit 6 itself passes inside of and along the receptacle and to the said conduit 6 are attached preferably flexible pipes 8, the ends of which are immersed in the vessels 5, which are provided with covers 9. From the covers 9 are leading exhaust pipes 10 which are connected to an exhaust conduit 11 provided with a constant pressure outlet valve 12 outside the receptacle 1. The conduit 11 terminates in a water trap 13.

The receptacle is further provided with electric conduits 14, to which the accumulators or plates are connected during the charging or forming. Said conduits 14 are connected to an electric generator or the like (not shown).

15 is a safety valve and 16 is manometer.

The charging of accumulators is carried out in the following way:

When the cars 4 with the accumulators have been brought into the receptacle the flexible pipes 8 are immersed in the accumulator jars and the exhaust pipes 10 are connected to the refill openings of the accumulators. The accumulators are further connected to the electric conduits 14 and the receptacle is closed. By means of a valve 17 in the branch conduit 7 the receptacle is then filled with air of a pressure of for instance of 6 kg./cm.$^2$, which pressure is determined by the outlet valve 12. Thereafter the valve 17 is closed and the valve 18 in the conduit 6 is opened and admits air of a pressure of for instance 7 kg./cm.$^2$ to the pipes 8, which air bubbles up through the electrolyte from the bottom of the vessels or jars and escapes through the exhaust conduit 11. Further the gas which is created during the charging or forming operation escapes through pipes 10 and conduit 11.

Thanks to the combination of a relatively high pressure and the gas bubbles, which move upwards through the electrolyte the charging or forming process is accomplished at a considerably shorter time as compared with usual methods. Further the chemical reactions are more effective so that the whole of the paste on the plates takes part therein. It is also possible to use acid of lower concentration. The duration of life and capacity of the accumulators can be increased by the use of the method according to the invention.

What I claim is:

1. A method of charging and forming electric accumulators and accumulator plates, where the plates are immersed in an electrolyte containing vessel and an electric current made to flow through the plates, comprising the steps of elevating the pressure in the electrolyte above that of the atmosphere and causing a gas to bubble up through the electrolyte.

2. A method of charging and forming electric accumulators and accumulator plates, where the plates are immersed in an electrolyte containing vessel and an electric current made to flow through the plates, comprising the steps of elevating the pressure in the electrolyte above that of the atmosphere and causing a gas to bubble up through the electrolyte from the bottom of the vessel.

3. A method of charging and forming electric accumulators and accumulator plates, where the plates are immersed in an electrolyte containing vessel and an electric current made to flow through the plates, comprising the steps of elevating the pressure in the electrolyte above that of the atmosphere and causing pressure air to bubble up through the electrolyte from the bottom of the vessel.

4. An apparatus for charging and forming electric accumulators and accumulator plates immersed in an electrolyte containing vessel, comprising a gastight receptacle adapted to receive at least one electrolyte containing vessel and provided with connecting means for connection with a pressure gas source, means to supply an electric current to said plates, gas conduits attached to said connecting means and adapted and arranged to be immersed in the vessel in order to bring gas to bubble up through the electrolyte, and a constant pressure outlet valve controlling the escape of gas from said receptacle.

References Cited in the file of this patent

UNITED STATES PATENTS

| 286,259 | Brush | Oct. 9, 1883 |
| 644,050 | Beckman | Feb. 27, 1900 |

FOREIGN PATENTS

| 5,680 | Great Britain | of 1883 |
| 1,385 | Great Britain | of 1893 |